US012409675B2

(12) United States Patent
Prinzinger

(10) Patent No.: US 12,409,675 B2
(45) Date of Patent: Sep. 9, 2025

(54) TOOL UNIT, PRESS FOR HOLDING SUCH A TOOL UNIT AND METHOD FOR A READY-TO-OPERATE ARRANGEMENT OF THE TOOL UNIT IN THE HOLDER OF THE PRESS

(71) Applicant: ANDRITZ SCHULER PRESSEN GMBH, Goeppingen (DE)

(72) Inventor: Helmut Prinzinger, Boehmenkirch (DE)

(73) Assignee: ANDRITZ SCHULER PRESSEN GMBH, Goeppingen (DE)

(*) Notice: Subject to any disclaimer, the term of this patent is extended or adjusted under 35 U.S.C. 154(b) by 540 days.

(21) Appl. No.: 17/498,018

(22) Filed: Oct. 11, 2021

(65) Prior Publication Data

US 2022/0024245 A1 Jan. 27, 2022

Related U.S. Application Data

(63) Continuation-in-part of application No. PCT/EP2020/059730, filed on Apr. 6, 2020.

(30) Foreign Application Priority Data

Apr. 12, 2019 (DE) ..................... 10 2019 109 700.2

(51) Int. Cl.
*B44B 5/00* (2006.01)

(52) U.S. Cl.
CPC .................................. *B44B 5/0052* (2013.01)

(58) Field of Classification Search
CPC ........ B21D 37/04; B21D 37/10; B21D 37/12; B21D 37/14; B21D 37/02; B44B 5/0019; B44B 5/0052; B30B 15/041; B21J 13/03
See application file for complete search history.

(56) References Cited

U.S. PATENT DOCUMENTS 3,111,100 A * 11/1963 Georgeff ................ B21D 37/04
72/414
3,638,473 A * 2/1972 McElroy .................. B21J 13/03
72/448
(Continued)

FOREIGN PATENT DOCUMENTS

CN 104 875 419 A 9/2016
CN 106 862 454 A 6/2017
(Continued)

OTHER PUBLICATIONS

The International Search Report for the corresponding international application No. PCT/EP2020/059730, dated Jul. 7, 2020 in the German language (3 pages).
(Continued)

*Primary Examiner* — Edward T Tolan
(74) *Attorney, Agent, or Firm* — Ronald S. Lombard

(57) ABSTRACT

A tool unit 20 and a press 21, particularly an embossing press. The tool unit 20 is simply and quickly arranged in or removed from a holder 23 of the press 21 in order to carry out a quick tool change with short downtime of press 21. For this purpose the tool unit 20 comprises a first tool 45 and a second tool 46 that are arranged along a tool axis A on a tool carrier 31. By means of a tool guide device 47, the second tool 46 is movably supported in a guided manner relative to the tool carrier 31 and the first tool 45, independent from guide devices of press 21. Therefore, the tool unit 20 can be prepared and set up during the ongoing operation of press 21. If desired or necessary, the prepared tool unit 20 is exchanged against the presently used tool unit 20.

21 Claims, 13 Drawing Sheets

(56) References Cited

U.S. PATENT DOCUMENTS

| | | | | | |
|---|---|---|---|---|---|
| 3,834,217 | A * | 9/1974 | Ducate | B21D 37/04 72/462 |
| 3,881,343 | A * | 5/1975 | Ducate | B21D 37/14 72/481.2 |
| 3,926,083 | A * | 12/1975 | Janiszewski | B21D 28/02 83/637 |
| 3,949,589 | A * | 4/1976 | Johnson | B21D 37/04 72/472 |
| 4,044,492 | A | 8/1977 | Carrieri et al. | |
| 4,044,592 | A | 8/1977 | Carrieri et al. | |
| 4,044,692 | A | 8/1977 | Carrieri et al. | |
| 4,703,644 | A * | 11/1987 | Waldner | B21J 15/24 83/575 |
| 4,912,960 | A * | 4/1990 | Kroener | B21D 37/14 72/462 |
| 5,458,057 | A | 10/1995 | Arens | |
| 5,535,655 | A * | 7/1996 | Kammann | B26D 7/26 83/559 |
| 8,869,582 | B2 * | 10/2014 | Cornish | B21J 5/12 72/353.2 |
| 2014/0366356 | A1 | 12/2014 | Spary | |

FOREIGN PATENT DOCUMENTS

| | | | |
|---|---|---|---|
| CN | 107116130 | A * | 9/2017 |
| CN | 207 481 298 | U | 6/2018 |
| CN | 108 367 397 | A | 8/2018 |
| CN | 109 433 993 | A | 3/2019 |
| CN | 109433957 | A * | 3/2019 |
| DE | 26 28 855 | C2 | 11/1986 |
| DE | 35 16 296 | A1 | 11/1986 |
| DE | 43 01 568 | A1 | 10/1993 |
| DE | 43 37 902 | A1 | 11/1995 |
| DE | 299 10 927 | U1 | 7/1999 |
| DE | 199 04 888 | C1 | 8/2000 |
| DE | 10 2007 015 631 | A1 | 10/2008 |
| DE | 10 2015 010 489 | A1 | 2/2017 |
| DE | 10 2016 120 054 | A1 | 4/2018 |
| EP | 0 294 765 81 | | 4/1992 |
| EP | 2 602 035 | A1 | 12/2013 |
| EP | 2990192 | A1 * | 3/2016 |
| JP | S53 67852 | U | 6/1978 |
| JP | S53 133853 | U | 10/1978 |
| JP | S56 100229 | U | 8/1981 |
| JP | S 61-52942 | A | 3/1986 |
| JP | H5-285553 | | 11/1993 |
| JP | H 072 418 44 | A | 9/1995 |
| JP | H 091 41 380 | A | 6/1997 |
| JP | H 081 555 | U | 11/1998 |
| JP | 2003290993 | A | 10/2003 |
| JP | 2008-119704 | A * | 5/2008 |
| SU | 795 703 | A1 | 1/1981 |
| WO | WO 2011/127925 | A1 | 10/2011 |
| WO | WO 2017/076720 | A1 | 5/2017 |

OTHER PUBLICATIONS

The English translation of the International Search Report for the corresponding international application No. PCT/EP2020/059730 (3 pages).

An Office Action for the corresponding German patent application No. 10 2019 109 700.2 to which the present application claims priority; dated Dec. 17, 2019; 9 pages.

Google generated English Translation of the substantive portion of the Office Action for the corresponding German patent application No. 10 2019 109 700.2 to which the present application claims priority; 9 pages.

The German Patent and Trademark Office issued communication dated Sep. 30, 2022, relative to an Opposition issued the same date, for the corresponding German application No. 10 2019 109 700.2, in the German Language, including a listing with the state of the art of all citations to Sep. 30, 2022 (3 pages).

A Notice of Reasons for Rejection dated Sep. 15, 2023, of the Japanese Patent Office in the Japanese language for the corresponding Japanese Patent Application No. 2021-559309. No English translation is readily available.

JP H 10137 889 A: Date: May 26, 1998; Japan; no translation.

KR 1007 327 12 B1; Date: Jun. 28, 2007: South Korea; no translation.

TW 379595 U; Date: Jan. 11, 2000; Taiwan; no translation.

WO 2015 181 768 A1; Date: Dec. 3, 2015; WIPO Italy; Publication in English.

An English translation of the substantive portion of the Office Action of the Chinese Patent Office, dated Mar. 31, 2023, for the corresponding Chinese Patent Application No. 2020800283288.

The Office Action and Search Report dated Mar. 31, 2023, of the Chinese Patent Office in the Chinese language for the corresponding Chinese Patent Application No. 2020800283288.

An Office Action being a Notice of rejection dated Nov. 26, 2024, of the Japanese Patent Office in the Japanese language for the corresponding Japanese Patent Application No. 2023-206465. No English translation is readily available.

* cited by examiner

TOOL UNIT, PRESS FOR HOLDING SUCH A TOOL UNIT AND METHOD FOR A READY-TO-OPERATE ARRANGEMENT OF THE TOOL UNIT IN THE HOLDER OF THE PRESS

CROSS-REFERENCE TO RELATED APPLICATION

This is a continuation-in-part application of pending international patent application PCT/EP2020/059730 filed Apr. 6, 2020 and claiming the priority of German Patent Application No. 10 2019 109 700.2 filed Apr. 12, 2019. The said international patent application PCT/EP2020/059730 and said German Patent Application No. 10 2019 109 700.2 are both incorporated herein by reference in their entireties as though fully set forth.

BACKGROUND OF THE INVENTION

The invention refers to a tool unit for a press, a press with a holder for such a tool unit as well as a method in order to arrange the tool unit in a condition ready for operation in the press. The method also comprises the exchange of an actually used tool unit with another tool unit.

Particularly in fast operating presses, e.g. embossing presses for embossing coins, medals, round blanks or other plate-shaped blanks, the exchange and set-up of tools for forming a blank, particularly a round blank, is very time consuming. Especially during minting of coins the embossing tools have to be very precisely orientated with regard to one another due to the filigree structures that have to be minted in a coin or medal. The set-up of a press prior to operation is quite time consuming. If during the operation wear occurs on the tools, it can be necessary to stop the press to exchange and re-orientate the tools and to subsequently resume operation. So far used embossing presses have therefore relatively long downtime durations.

A minting press is, for example, known from DE 26 28 855 C2. It comprises a holder for a female die (first tool) as well as a ram supporting a male die (second tool). The holder for the first tool consists of semi-circular bowls that form a hollow space for the first tool in the clamped condition. The two tools can be exchanged separately and have to be orientated relative to one another in the context of start-up of the press, such that optimum embossing results are obtained.

DE 10 2015 010 489 A1 describes a forging press having a tool carrier. The tool carrier has a sliding surface. For exchange one or multiple tools can be slidably supported in a guiding manner on this sliding surface.

Starting from the known prior art, it can be considered as object of the present invention to provide a tool unit for a press, particularly an embossing press, that can be inserted or removed with short downtimes of the press.

This object is solved by means of a tool unit, a press, as well as a method having the features of the claims.

SUMMARY OF THE INVENTION

The inventive tool unit for a press has a tool carrier that is configured to be exchangeably connected with the press. Particularly the tool carrier is configured to be arranged, positioned and/or orientated in a respective holder on a press frame of the press and to be releasably attached to the press frame. The tool unit forms a unit that can be uniformly handled in order to arrange it in a press or remove it from a press.

The tool unit has in addition a first tool as well as a second tool. The two tools are arranged in alignment with a tool axis on the tool carrier. The two tools are so-to-speak coaxially arranged to the tool axis A.

The tool unit comprises a tool guide device by means of which the second tool is movably supported in a guided manner on the tool carrier along the tool axis. In doing so, the second tool can be moved in a stroke direction toward the first tool and opposite the stroke direction in a back-stroke direction away from the first tool. The two tools are thus orientated relative to one another and guided by means of the tool unit itself. If the tool unit is inserted in the press, the second tool can be coupled with a ram of the press by means of a respective coupling device such that the movement of the ram can be transmitted on the second tool and thus a stroke in stroke direction or a back-stroke in back-stroke direction can be initiated.

In that the two tools are already movably guided and orientated relative to one another already in the tool unit, the insertion and removal of the tools in/from the press is remarkably simplified. The tool unit is handled as module or unit in a body, such that a cumbersome alignment of the two tools relative to one another in the press is omitted. Different to the presses known so far, particularly embossing presses, the second tool does not use the guide device of the ram, but the tool unit has a separate own tool guide device for the second tool.

Preferably the tools of the tool unit are embossing tools for an embossing press, in order to emboss, for example, coins, medals or the like from a plate or disc-shaped blank or a round blank. The blank or round blank can be a one-part blank or a multiple-part blank consisting of a core and one or multiple rings arranged concentrically around the core. The outer contour of the round blank or a round blank part can be, for example, circular or polygonal or can have another substantially arbitrary shape.

It is advantageous, if the tool guide device is configured to support transverse movements of the second tool transverse to the tool axis and/or tilting movements of the second tool relative to the tool axis. Particularly the tool guide device can be configured such that the second tool can only be moved in a guided manner along the tool axis in one single degree of freedom and movements in all other degrees of freedom—apart from a technically necessary clearance—are supported.

In one embodiment the tool guide device can have a guide column that is movably supported in an assigned guide bushing parallel to the tool axis. Thereby, for example, the first tool can be movably coupled with the at least one guide column, for example, it can be immovably arranged relative to the guide column. The at least one guide bushing can be provided on the tool carrier.

It is advantageous, if the second tool comprises a second tool coupling surface by means of which the second tool abuts on a ram surface of a ram of a press at least during its movement in stroke direction. Preferably the tool coupling surface and the ram surface are planar orthogonal to the tool axis. The second tool and the ram are configured in the area of the tool coupling surface and the ram surface abutting against each other, such that a tilting movement of the ram relative to the tool axis and/or transverse movements of the ram orthogonal to the tool axis are not transmitted on the second tool.

In an embodiment of the tool unit the first tool is movable between a forming position and an ejecting position. In the ejecting position a formed round blank can be ejected from a ring after the forming or embossing. In the ejecting position the first tool is supported in stroke direction, particularly immovably and can thereby be supported either on the tool carrier or on the press.

As an alternative in another embodiment it is also possible that the first tool is immovably arranged relative to the tool carrier.

A transport part having a sliding surface can be preferably provided on the tool carrier. The transport part having the sliding surface is configured to allow the sliding transport of round blanks in the tool unit or out of the tool unit. Thereby the round blanks can be positioned between the two tools in order to form or emboss and/or punch them subsequently and to cart them off over the sliding surface after embossing and/or punching.

It is in addition advantageous, if a movement guide device is provided on the tool carrier. The movement guide device is configured to cooperate with a frame guide device on a press frame of the press. By means of the movement guide device and the frame guide device the tool unit can be moved into the holder of the press or out of the holder of the press.

In a preferred embodiment at least one positioning recess is provided on the tool carrier of the tool unit. The at least one positioning recess is configured to cooperate with a positioning body of a positioning device of the press. Due to insertion of the at least one positioning body in the at least one positioning recess, the tool carrier and thus the tool unit can be positioned or orientated relative to a press frame of the press. Originating from its open end the at least one positioning recess comprises a tapering cross-section and can thus be particularly conical. The at least one positioning projection is preferably configured complimentarily to the at least one positioning recess.

An inventive press for forming a round blank comprises a holder for an exchangeable tool unit, particularly for a tool unit according to any of the embodiments, as they have been described above. The press has a positioning device having at least one positioning body. The positioning body can be moved in an alignment position in that it projects at least partly in the respectively assigned positioning recess on the tool unit. Due to the cooperation between the at least one positioning body and the at least one positioning recess, positioning and/or orientation of the tool unit relative to the press can occur. In addition, the press comprises a clamping device that is configured to clamp the tool unit in the holder. The clamping device is particularly configured such that during creation of the clamping force no form-fit is created by means of the clamping device, but a force-fit or friction-fit connection between the clamping device and the tool unit is maintained. It is particularly advantageous, if the press is configured to move the at least one positioning body out of the alignment position after clamping of the tool unit, such that no contact between the at least one positioning body and the at least one positioning recess exists. In another embodiment the clamping device can be alternatively or additionally configured such that a form-fit is created during creation of the clamping force.

In a preferred embodiment the press has a coupling device. The coupling device is configured to couple the second tool with the ram of the press, such that the movement of the ram can be transferred to the second tool in order to move it in stroke direction or in back-stroke direction.

It is preferred, if the coupling device is configured to push or pull the second tool in back-stroke direction with a coupling force toward the ram. A stop surface can be provided on the press that can be preferably positioned or adjusted against which the second tool is pressed or pulled by means of the coupling force, if it takes a rest position. In the rest position the second tool has a maximum distance to the first tool, if the first tool is in the forming position. In the rest position the second tool is not lifted from the stop surface by the ram. The ram is located in the range of its return point distant from the first tool in back-stroke direction that can also be denoted as lower return point.

It is advantageous, if the coupling device is configured to allow transverse movements of the ram transverse to the tool axis and/or tilting movements of the ram relative to the tool axis. In doing so, it is avoided that such transverse movements or tilting movements of the ram are transferred to the second tool. This avoids a clamping of the second tool that is guided by means of the tool guide device on the tool unit independent from the guidance of the ram.

For a ready-to-operate arrangement of a tool unit in the holder of a press it is particularly proceeded as follows:

First, the tool unit is inserted in the holder of the press. The movement guide device on the tool holder and the frame guide device on the press frame can be used for this purpose, for example, and the tool unit can be moved transverse to the tool axis in the holder on the press frame. Subsequently, the tool unit is positioned and/or orientated relative to the press frame. For this the at least one positioning body is moved into the respectively assigned at least one positioning recess on the tool unit by means of the positioning device such that the at least one positioning body gets in contact with the tool unit in the at least one positioning recess, such that the position and/or orientation of the tool unit relative to the press frame is defined. Subsequently the tool unit is clamped on the press frame by means of a clamping device. After clamping the at least one positioning body can be retracted from the respectively assigned positioning recess again, such that no contact exists between the at least one positioning body and the tool unit.

It is in addition advantageous, if a movement coupling between the first tool and the ram of the press is established by means of a coupling device of the press, particularly in that the second tool is urged with a coupling force in back-stroke direction against the ram.

BRIEF DESCRIPTION OF THE DRAWINGS

Advantageous embodiments of the invention are derived from the dependent claims, the description and the drawings. In the following, preferred embodiments of the invention are explained in detail based on the attached drawings. The drawings show:

DETAILED DESCRIPTION OF THE INVENTION

Figure 6:
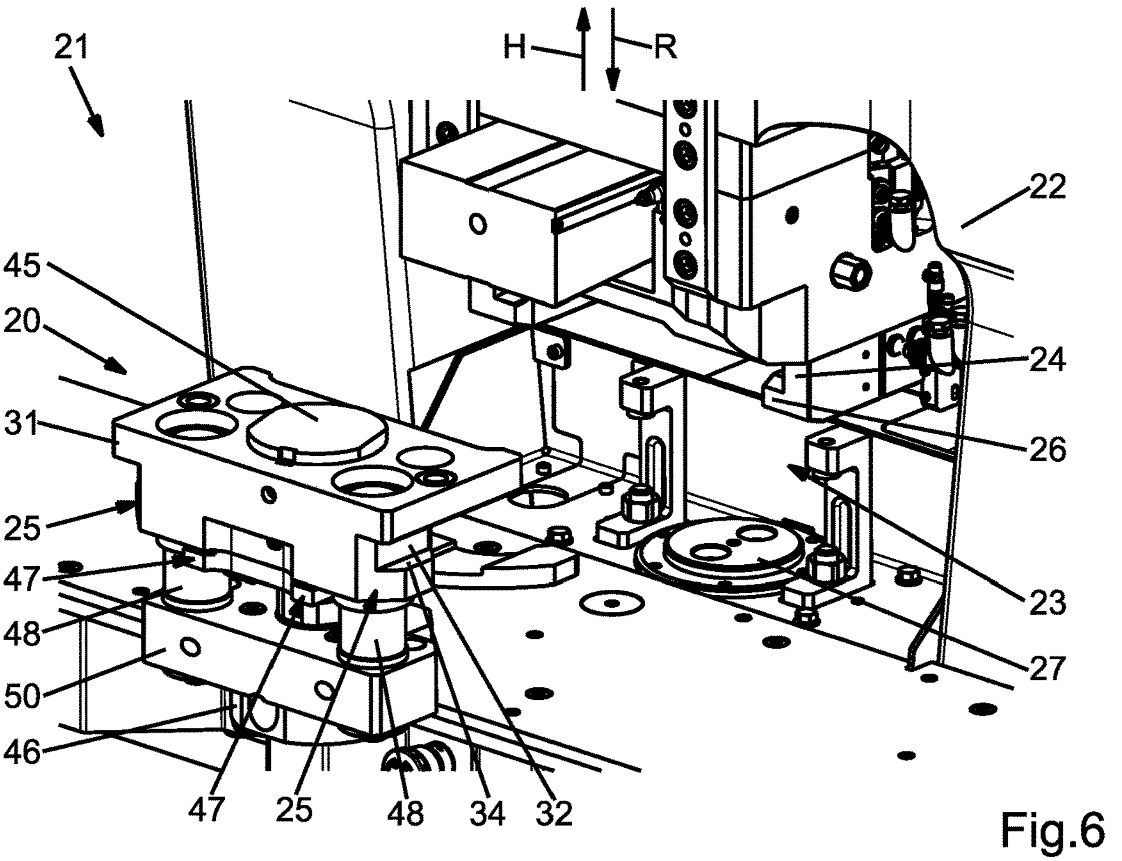
FIG. 6 a perspective illustration of an embodiment of a tool unit and a press prior to insertion of the tool unit in the holder of the press.
Figure 7:
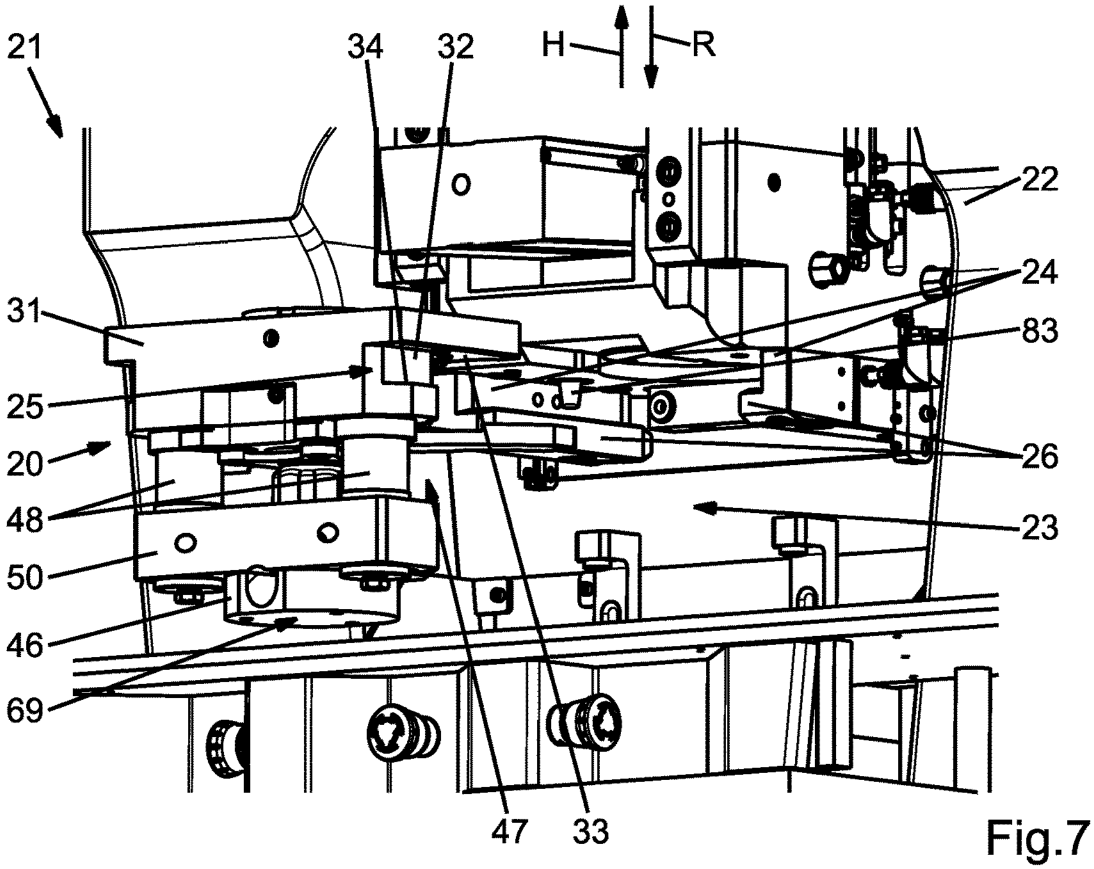
FIG. 7 the embodiment of the tool unit and the press of FIG. 6 in another perspective view.

In FIGS. 6 and 7 a perspective illustration of an embodiment of a tool unit 20 as well as a press 21 is respectively illustrated, wherein the press 21 is only shown partly. The press 21 is configured as embossing press, particularly minting press, to form one piece or multi-piece round blanks in coins, medals or the like.

Figure 8:
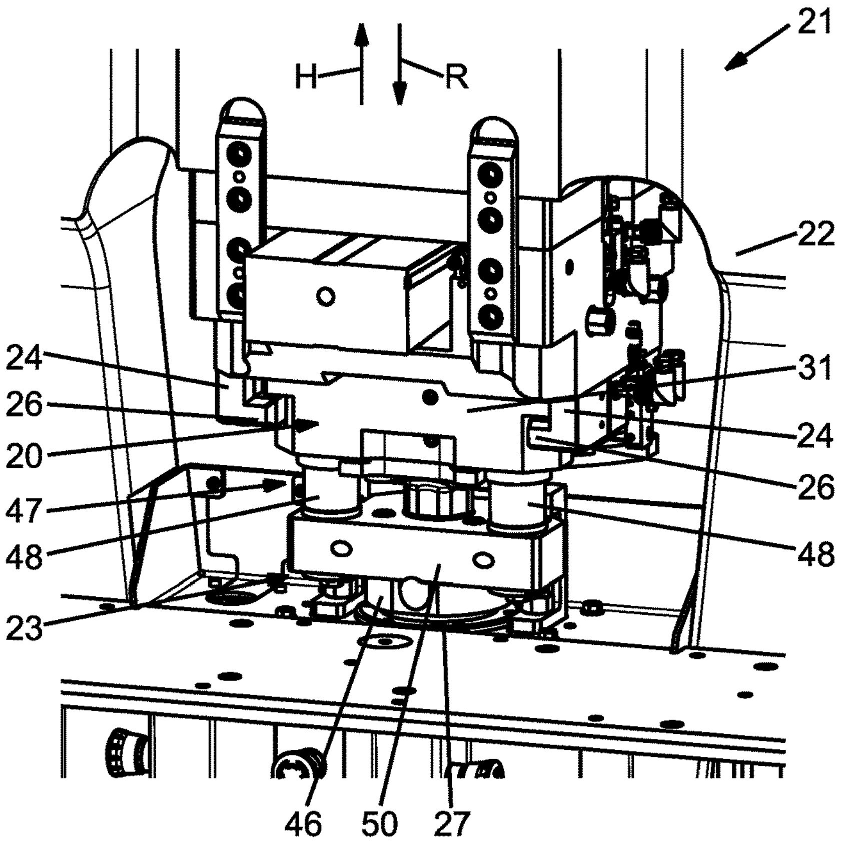
FIG. 8 the embodiment of the tool unit and the press according to FIGS. 6 and 7 after the tool unit has been inserted in the holder of the press.
Figure 9:
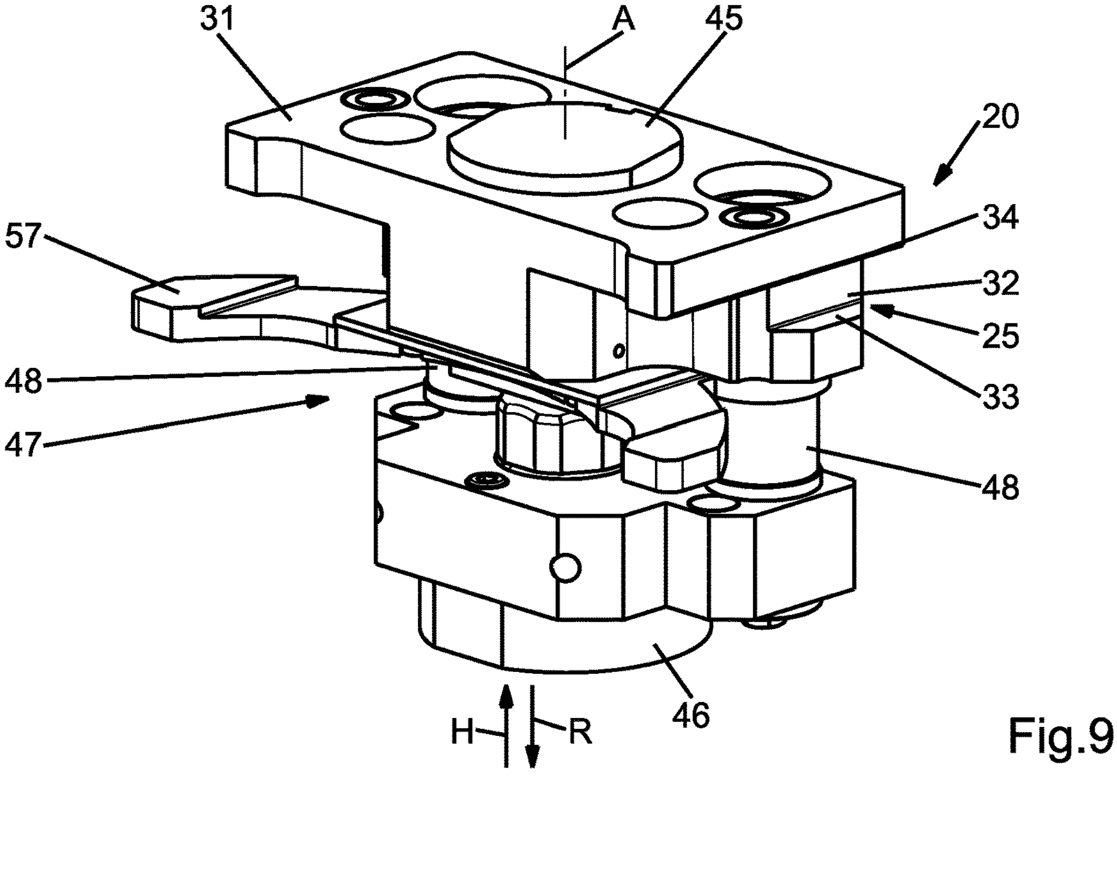
FIG. 9 a perspective view of the embodiment of the tool unit according to FIGS. 6-8.

The press 21 has a press frame 22 with a holder 23 that is configured for holding a tool unit 20. In the embodiment a frame guide device 24 is provided in the holder 23 that cooperates with a movement guide device 25 provided on the tool unit 20, such that the tool unit 20 can be moved orthogonal to a stroke direction H and a back-stroke direction R in the holder 23 on the press frame 22. FIG. 8 illustrates the tool unit 20 completely inserted in the holder 23.

In the preferred embodiment the frame guide device 24 comprises two guide projections 26 arranged with distance opposite to one another that form a guide rail in each case. The guide projections 26 or guide rails extend in an insertion direction orthogonal to a stroke direction H and a back-stroke direction R. The stroke direction H and the back-stroke direction R are orientated opposite to one another and define the direction in which a ram 27 of the press 21 and/or a tool of the tool unit 20 coupled with the ram 27 can be moved for forming a round blank. The movement of the ram 27 is initiated by means of a ram drive 28 of the press 21.

Figure 1:
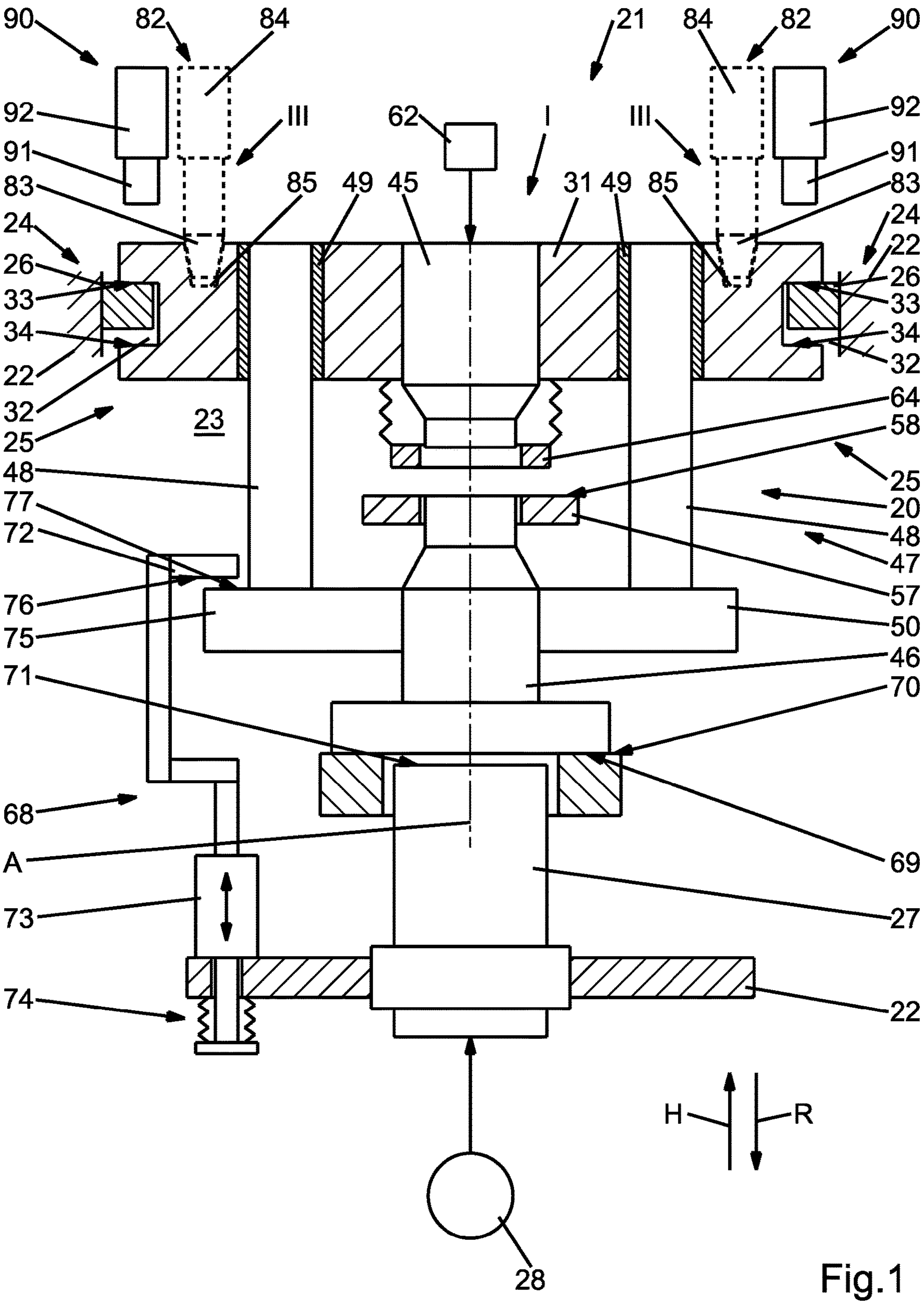
FIG. 1 a schematic block diagram-like illustration of a tool unit arranged in a holder of a press during positioning and/or orientating.

The tool unit 20 has a tool carrier 31 on which the movement guide device 25 is configured or provided. In the embodiment the movement guide device 25 comprises a groove-like movement recess 32 respectively that is limited by two groove flanks 33, 34, as shown in FIG. 1, that are arranged with distance opposite to one another. In the embodiment the stroke direction H and the back-stroke direction R are substantially vertically aligned such that one groove flank forms a top groove flank 33 while the groove flank arranged vertically below is a bottom groove flank 34, if the tool unit 20 is orientated in a position in which it can be inserted in the holder 23. During insertion of the tool unit 20 in the holder 23 of the press 21 an assigned guide projection 26 projects in the movement recess 32 respectively. Thereby the top groove flank 33 is placed on top of the respectively assigned guide projection 26 in the embodiment.

Figure 14:
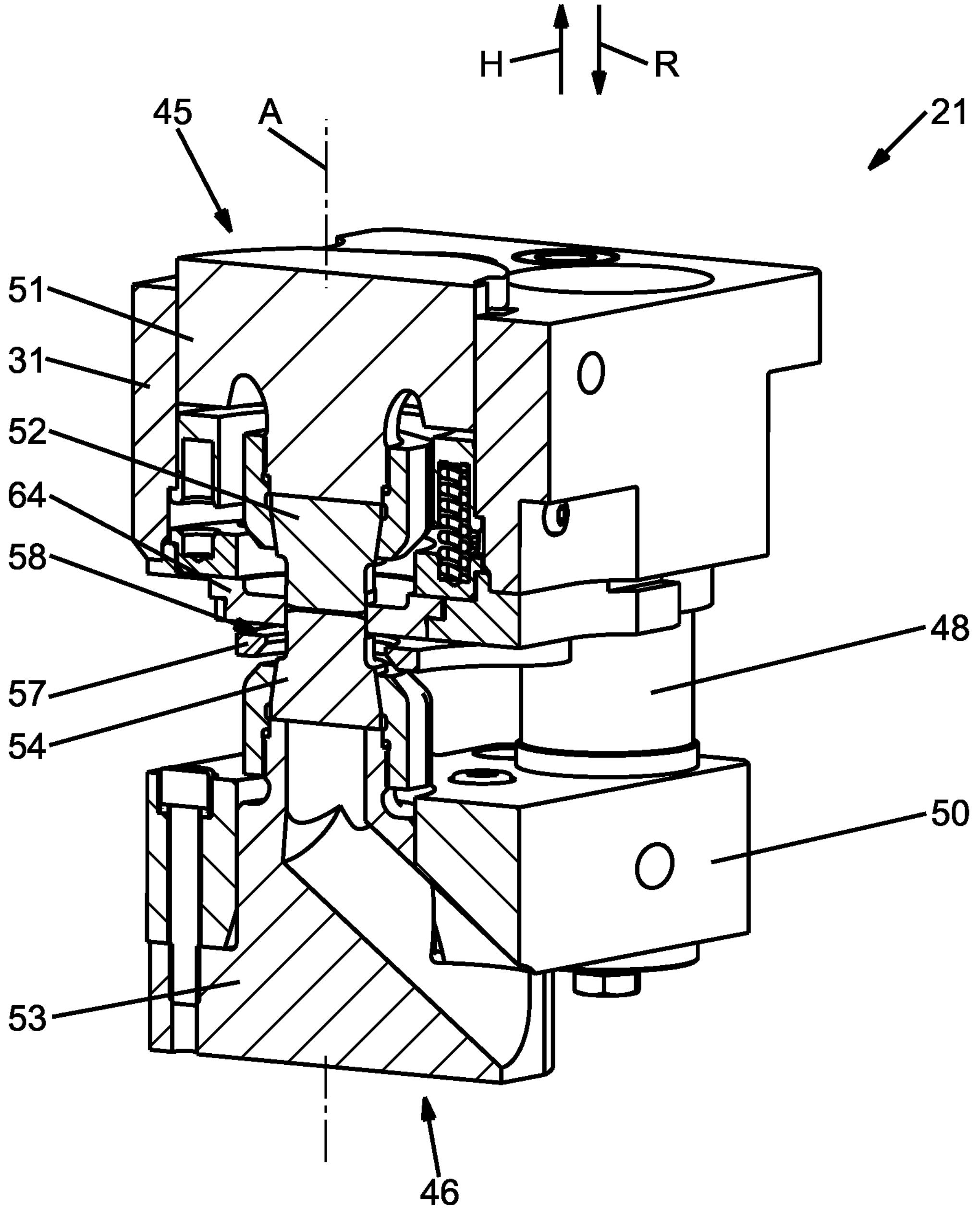
Figure 15:
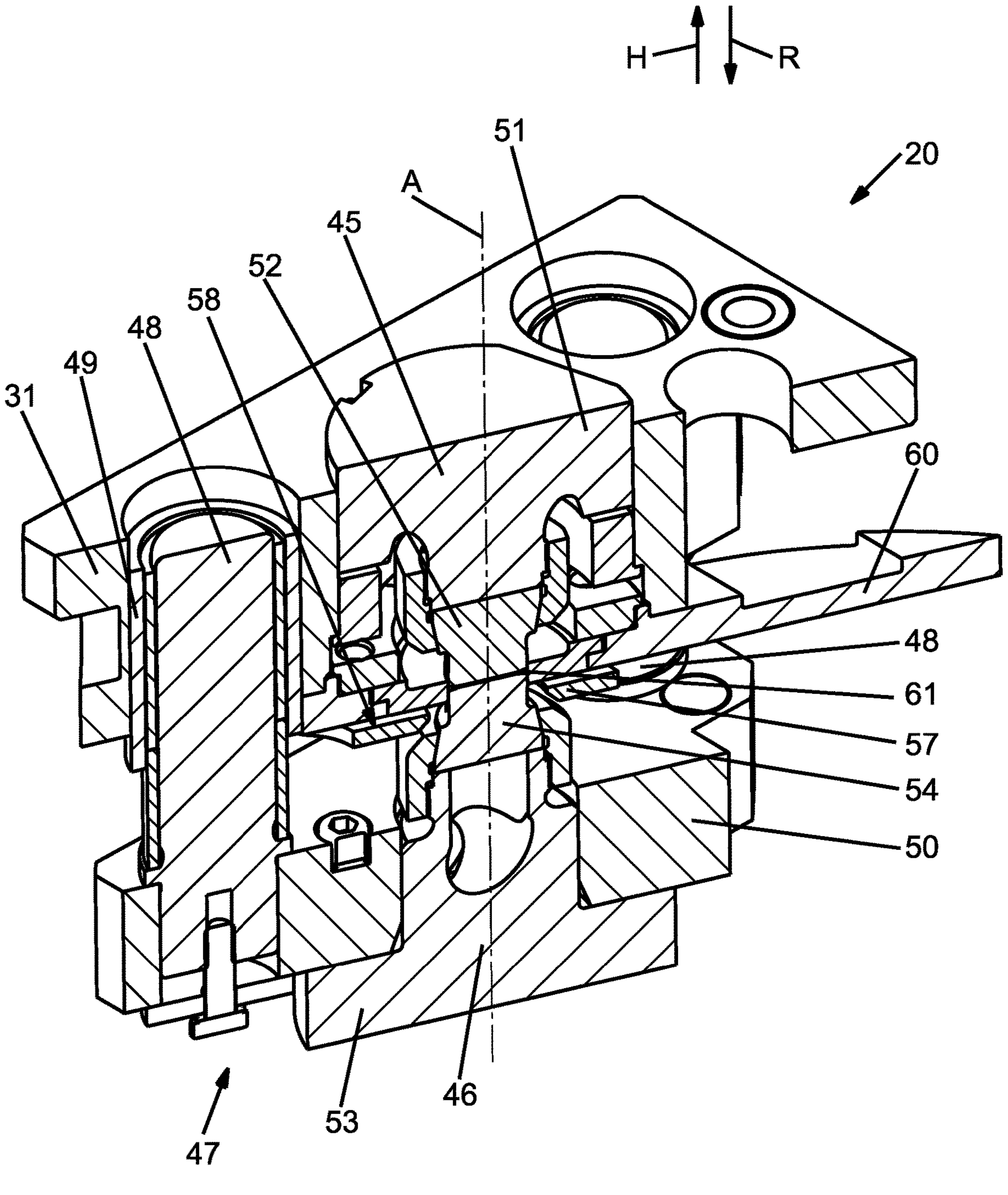

In FIGS. 1-5 the decisive parts of the tool unit 20 as well as elements of the press 21 are illustrated in a kind of block diagram respectively. FIGS. 14 and 15 show a perspective sectional illustration through a specific embodiment of the tool unit 20 according to FIG. 6-13 respectively.

Figure 2:
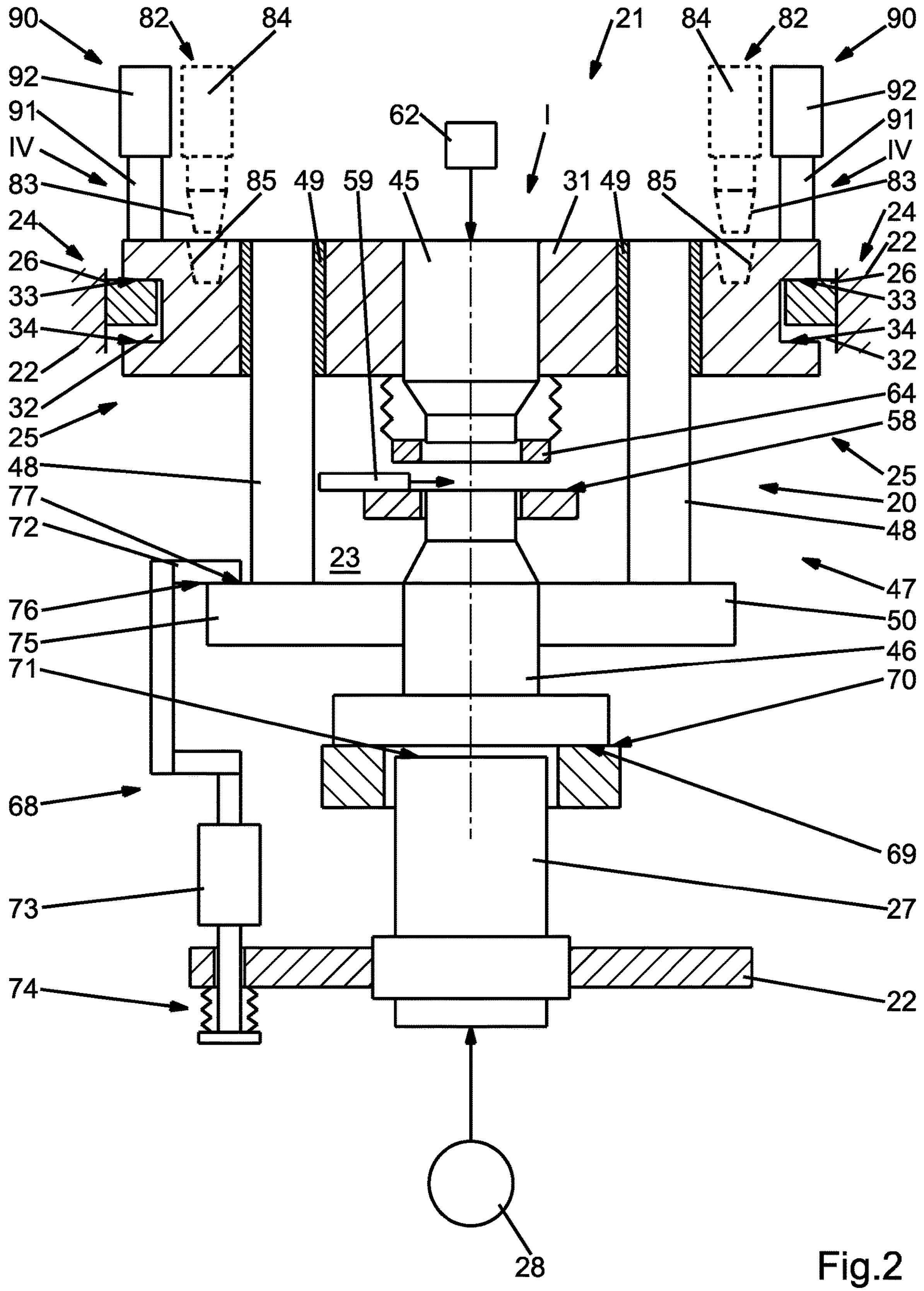
FIG. 2 the block diagram of FIG. 1 after alignment in a condition ready for operation during the supply of a round blank in the tool unit.
Figure 3:
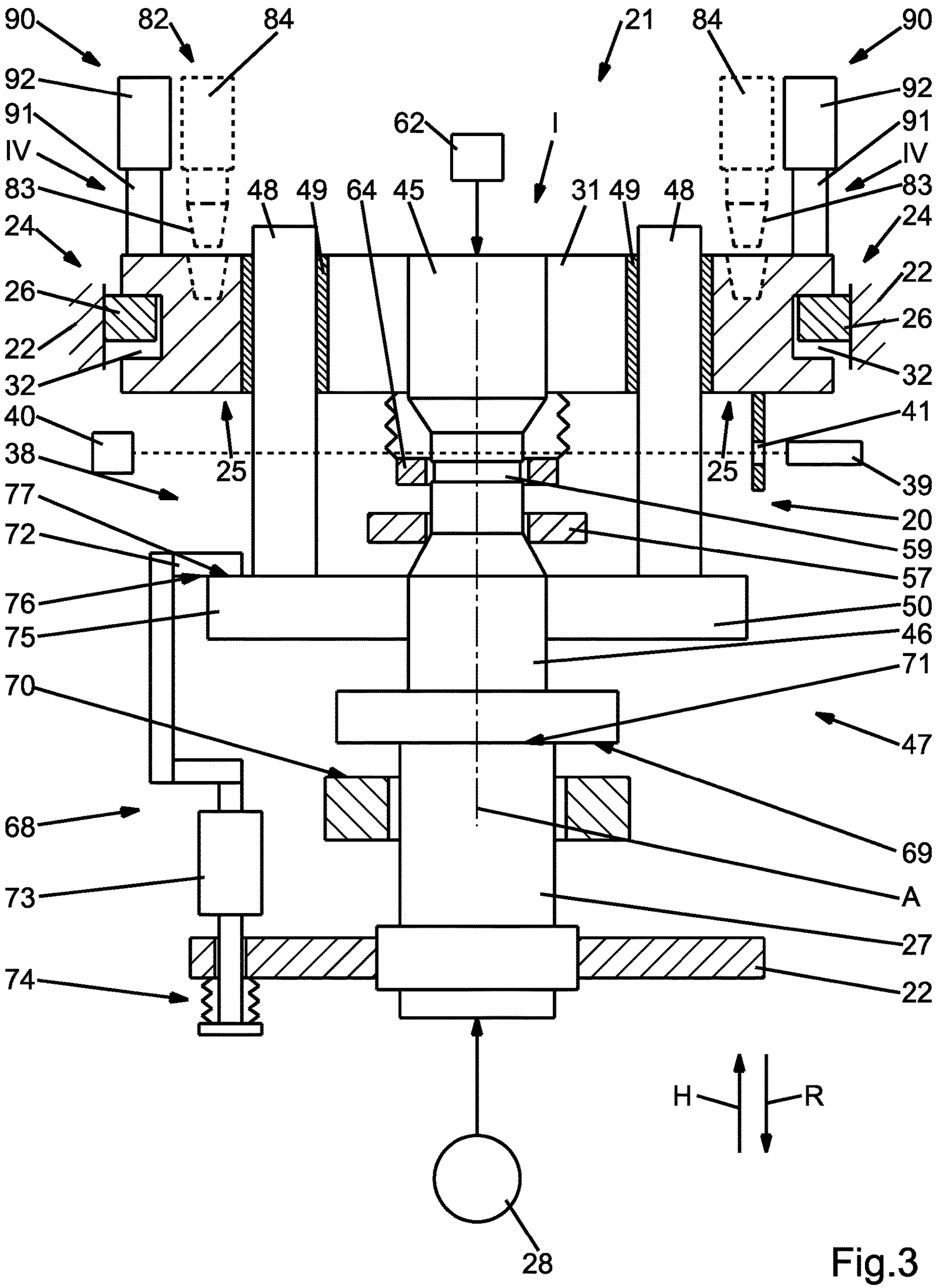
FIG. 3 the embodiment according to FIGS. 1 and 2 during embossing of the supplied round blank.

In the block diagram illustrations according to FIGS. 1-5, the tool unit 20 is arranged in the holder 23 of the press 21. Complete insertion of the tool unit 20 in the holder 23 is, for example, detected by means of a sensor device 38. The sensor device 38 is illustrated in FIG. 3, for example, and for the sake of clarity omitted in FIGS. 1, 2 and 4. In the embodiment the sensor device 38 comprises a light transmitter 39, for example a laser or the like, as well as a light receiver 40. A through-hole 41 is provided on the tool carrier 31 of the tool unit 20 that clears the light path between the light transmitter 39 and the light receiver 40, if the tool unit 20 is completely and correctly arranged in the holder 23. If the tool unit 20 is not in the correct position in the holder 23, the tool carrier 31 or at least a part thereof blocks the light path between the light transmitter 39 and the light receiver 40, such that dependent on the signal at the light receiver 40 a correct or incorrect arrangement of the tool unit 20 in the holder 23 can be recognized.

Instead of the light transmitter 39 and the light receiver 40, also a different sensor technology can be used such as a proximity switch or a contact switch that can be operated electrically and/or magnetically.

The tool unit 20 comprises a first tool 45 as well as a second tool 46 that are arranged in alignment along a common tool axis A. According to the example, the first tool 45 is arranged vertically above the second tool 46, if the tool unit 20 is arranged in the holder 23. The tool unit 20 also comprises a tool guide device 47 by means of which the second tool 46 can be moved in stroke direction H toward the first tool 45 and opposite in the back-stroke direction R away from the first tool 45. Preferably the tool guide device 47 is configured such that tilting movements of the second tool 46 relative to the tool axis A and/or transverse movements of the second tool 46 radially or orthogonal to the tool axis A are supported on the tool carrier 31—apart from a technically necessary clearance. The tool guide device 47 is thus configured as linear guide for movement of the second tool 46 along the tool axis A.

In the illustrated preferred embodiment the tool guide device 47 comprises two guide columns 48 that extend parallel to one another with distance from the tool axis A in stroke direction H or back-stroke direction R. Each guide column 48 is movably guided in an assigned guide bushing 49 in stroke direction H and back-stroke direction R. The guide bushings 49 are arranged on the tool carrier 31 or in the tool carrier 31. For this purpose cavities or through-holes can be provided in the tool carrier 31, for example, in which one of the guide bushings 49 is arranged in each case. The guide bushings 49 can be configured as friction guide bushings or also as roller guide bushings for the guide columns 48.

As schematically apparent from FIGS. 1-5 and in an embodiment of the tool unit 20, particularly from FIG. 15, the two guide columns 48 are arranged immovably relative to the second tool 46. For this a transverse support 50 and e.g. a plate-shaped transverse support 50 is provided in the embodiment, on which the two guide columns 48 are attached. In addition, the second tool 46 is attached on the transverse support 50. The transverse support 50 can be an integrally formed body.

The two tools 45, 46 of the tool unit 20 are preferably multi-part tools, which is particularly apparent from FIG. 15. The first tool 45 has a first pressure piece 51 on which a first embossing stamp 52 is attached. The second tool 46 comprises a second pressure piece 53 on which a second embossing stamp 54 is attached correspondingly. In modification thereto, however, it would also be possible to configure the first tool 45 and the second tool 46 in a one-piece integral manner respectively.

In addition, a transport part 57 is attached on the tool carrier 31 that is according to the example configured in a plate-shaped manner. The transport part 57 comprises on its side facing toward the first tool 45 a sliding surface 58 that extends substantially orthogonal to the tool axis A in one plane. The sliding surface 58 is configured to allow a sliding transport of round blanks 59 to be formed or to be embossed. For this purpose a respective transport device, not shown in the drawings, can be provided in order to transport round blanks 59 in the tool unit 20 and after forming or embossing of the respective round blank 59 out of the tool unit 20. For example, a rotary disc, not shown in the drawings, can be used as transport device that is stepwise rotatable around a rotation axis and comprises multiple transport pockets for holding one round blank 59 respectively with distance to its rotation axis. In each rotational position of the rotary disc one transport pocket is aligned with the tool axis A of the tool unit 20. The round blank 59 present in one of the transport pockets slides on the sliding surface 58 during rotation of the rotary disc in a position in which it is located between the two tools 45, 46 and can be formed or embossed by means of a stroke of the second tool 46 relative to the first tool 45.

Figure 10:
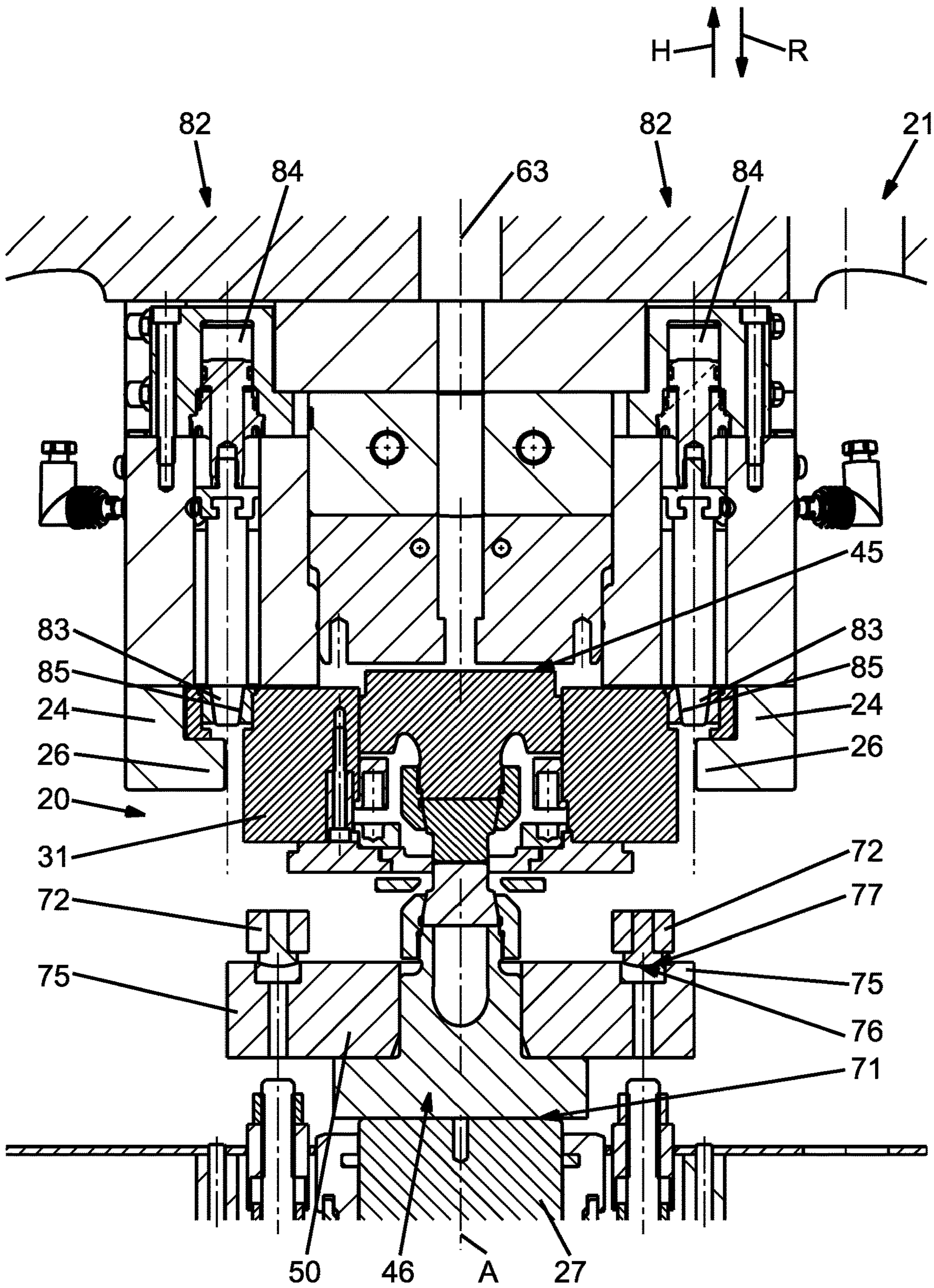
FIGS. 10-13 a sectional illustration through the tool unit and the press according to FIGS. 6-9 respectively, wherein the tool unit is arranged in the holder of the press; and, FIGS. 14 and 15 a perspective sectional illustration of an embodiment of the tool unit according to FIGS. 6-13 respectively.

Subsequently, the embossed round blank 59 can be ejected back into the transport pocket, e.g. by means of an ejector device 62. The ejector device 62 can comprise, for example, an ejector 63 that is movable in stroke direction H and back-stroke direction R and on which the first tool 45 is supported, if the tool unit 20 is arranged in the holder 23 (FIG. 10). By means of the ejector device 62 and particularly the ejector 63, the first tool 45 can be moved between a forming position I (FIGS. 1-3 and 5) and an ejecting position II (FIG. 4).

The ejector device 62 is required, if an embossed round blank 59 does not readily fall by itself through the weight force back into the transport pocket. In the embodiment a ring 64 is provided adjacent to the first tool 45, if it is in the forming position I, wherein the ring 64 is arranged on the tool carrier 31 and is supported on the tool carrier 31 in a spring-elastic manner. During forming or embossing of the round blank, the round blank 59 is located inside ring 64 (FIG. 3). The ring 64 limits the radial expansion of the round blank 59 during forming or embossing. After forming or embossing the round blank 59 can be held or clamped in the ring 64 in a force-fit manner. By means of a relative movement between ring 64 and first tool 45 the embossed round blank 59 can be ejected from ring 64 and conveyed back in the transport pocket.

Figure 4:
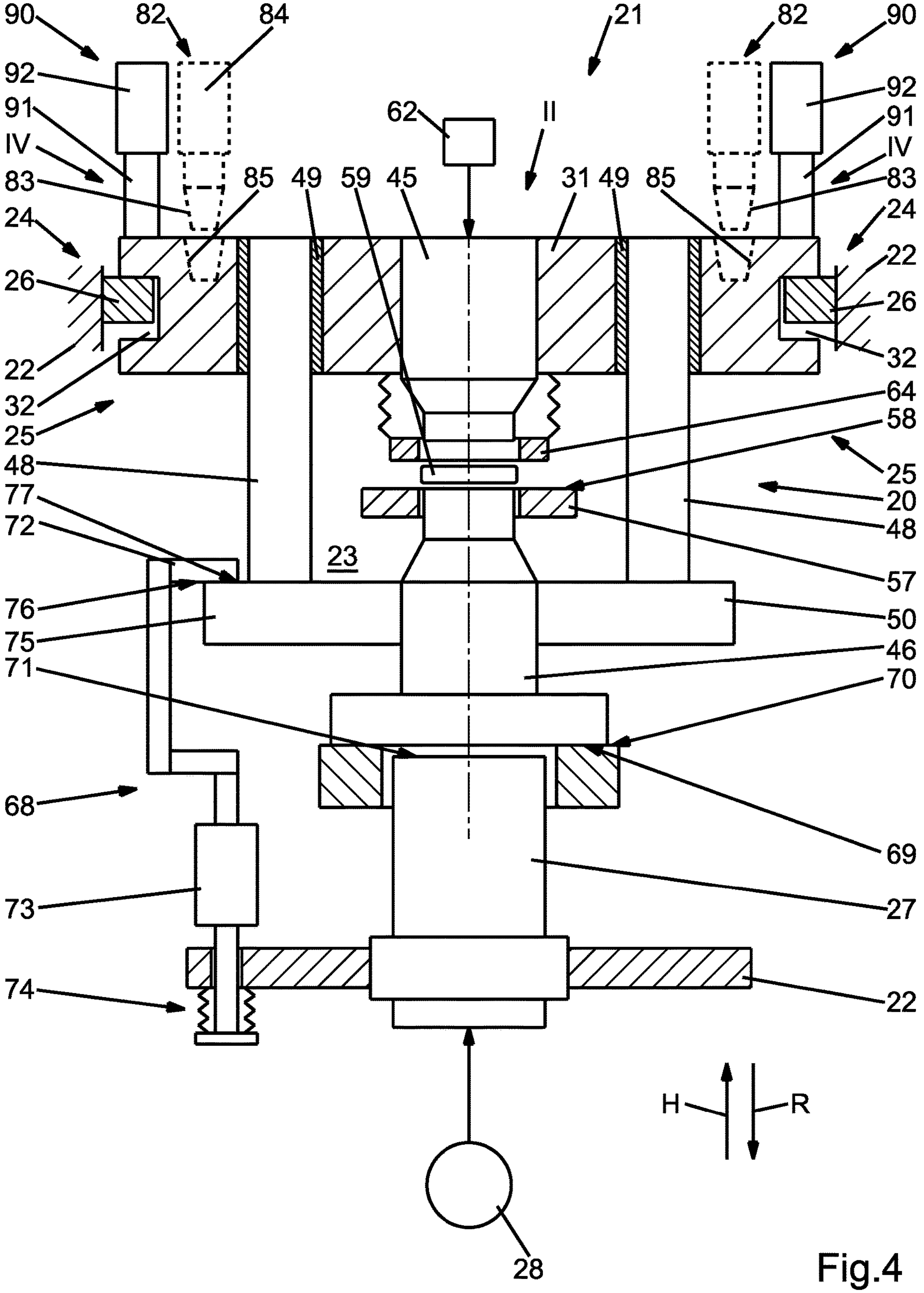
FIG. 4 the embodiment according to FIGS. 1-3 during the ejection of the round blank after embossing.

In the embodiment the first tool 45 is moved from the forming position I into the ejecting position II for this purpose, such that the first tool 45 projects at least partly into ring 64 and ejects the formed or embossed round blank 59 as schematically shown in FIG. 4. For this the ejector 63, on which the first tool 45 is supported, is moved in back-stroke direction R. Subsequently the embossed round blank 59 can be discharged by means of the transport device and according to the example by means of the rotary disc from the tool unit 20 and a new round blank 59 to be embossed can be supplied that is located in the adjacent transport pocket of the rotary disc, not shown in the drawings.

For movement coupling of the second tool 46 with the ram 27 of the press 21, the press 21 comprises a coupling device 68. The coupling device 68 is configured to apply a coupling force to the second tool 46 that urges the second tool 46 in back-stroke direction R toward the ram 27 of the press 21. In the embodiment in the coupled condition the coupling device 68 applies a tensile force on the second tool 46 in back-stroke direction R (FIGS. 2-5). In a rest position of the second tool 46 (FIG. 2) a tool coupling surface 69 of the second tool 46 is in abutment against a stop surface 70 of press 21 or press frame 22. In the embodiment the stop surface 70 is configured as ring surface that is arranged coaxially to the ram 27. The tool coupling surface 69 is facing the ram surface 71 of ram 27. In the rest position illustrated in FIG. 2 the ram surface 71 can be arranged with distance to the tool coupling surface 69.

According to the example, the tool coupling surface 69 is orientated in a plane orthogonal to the tool axis A. As illustrated by way of example, the ram surface 71 extends substantially orthogonal to the stroke direction H or back-stroke direction R. The ram surface 71 can at least deviate in one or more positions of the ram 27 from the ideal parallel orientation relative to the tool coupling surface 69 or can move during the movement in stroke direction H or back-stroke direction R, also orthogonal to the stroke direction H or back-stroke direction R. Due to the coupling device 68, it is avoided that such an undesired ram orientation or ram transverse movement is transmitted on the second tool 46 in that the coupling device 68 does not establish a movement coupling in these degrees of freedom between the ram 27 and the second tool 46. Preferably only the movement coupling in stroke direction H or back-stroke direction R is established by means of the coupling device 68.

According to the example, the coupling device 68 has a coupling part 72 that is connected by means of an appropriate lever arrangement or another connection with an actuator unit 73. The coupling part 72 is urged and thus biased in back-stroke direction R relative to the press frame 22 by means of a biasing device 74, e.g. a spring arrangement. The actuator unit 73 is configured to position or move the coupling part 72 against the force of the biasing device 74 in stroke direction H. Thereby the actuator unit 73 can serve as stop in order to inhibit a movement of the coupling part 72 in back-stroke direction R due to the biasing force of the biasing device 74 (FIG. 1). As soon as the actuator unit 73 is moved in a condition or position in which the coupling part 72 can be freely moved by the biasing device 74 in back-stroke direction R, the coupling part 72 can be brought in abutment with a counter coupling part 75 that is coupled with the second tool 46. The counter coupling part 75 is immovably arranged relative to the second tool 46 according to the example and can be provided on the transverse support 50 or can be formed by a part of the transverse support 50.

Figure 12:
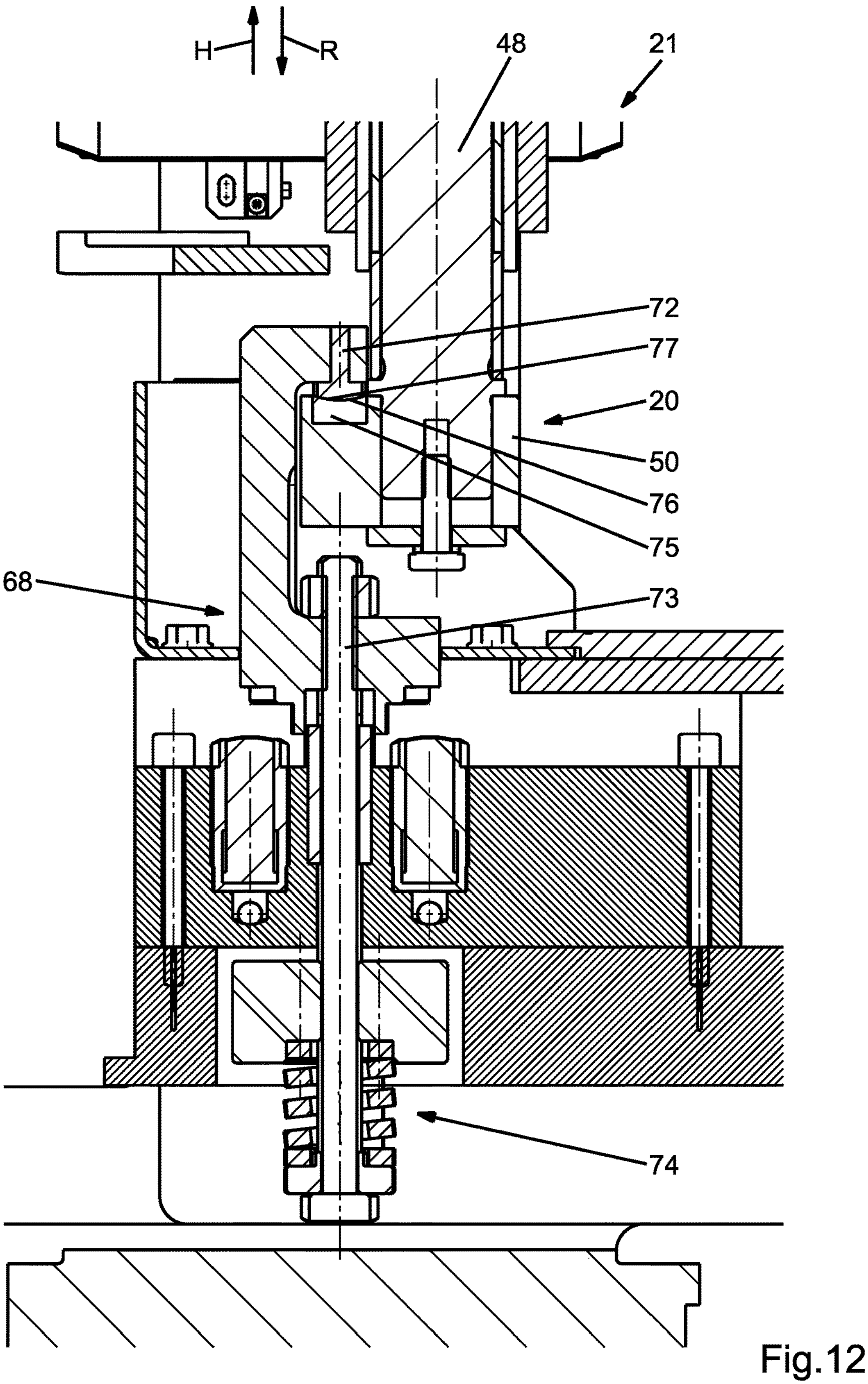
Figure 13:
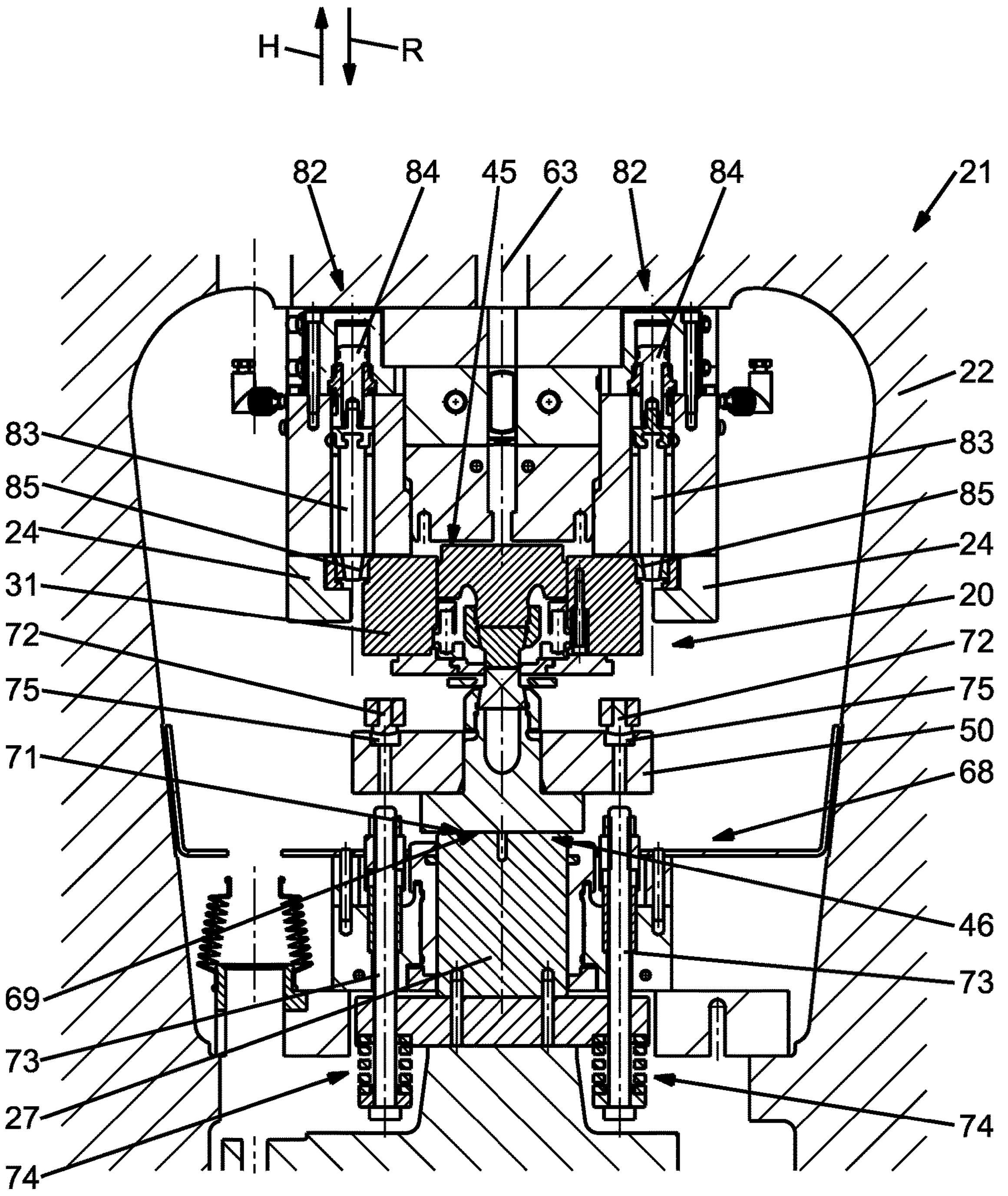

As particularly apparent from FIGS. 10 and 12 in an embodiment, a coupling surface 76 is provided on the coupling part 72 that particularly corresponds to a ball shell surface section. A counter coupling surface 77 is provided on the counter coupling part 75 that is complimentary to the coupling surface 76 and according to the example also corresponds to a ball shell surface section. In the embodiment the coupling surface 76 is convex, while the counter coupling surface 77 is concave. Also a vice versa arrangement is possible as an alternative to the illustrated embodiment. The surfaces are in sliding movable abutment, if a coupling between the ram 27 and the second tool 46 is established (FIGS. 2-5). The coupling surface 76 and the counter coupling surface 77 can also have other contours than the form having concave or convex ball shell surface sections illustrated in FIGS. 10 and 12.

Because the coupling surface 76 and the counter coupling surface 77 are in a slidably movable abutment against one another, it is achieved that the coupling device 68 allows tilting movements of the ram 27 of the press 21 relative to the tool axis A and/or transverse movements orthogonal to the tool axis A and does not or only in a negligible manner transfer such movements on the second tool 46.

The coupling device 68 can comprise multiple coupling parts 72 that cooperate with respectively one counter coupling part 75 of the tool unit 20. On the coupling part 72 a biasing force can be applied by a common or by respectively one biasing device 74 and can comprise a common or respectively one actuator unit 73. In the embodiment according to FIGS. 6-15 the press 21 comprises two coupling parts 72 having a biasing device 74 and an actuator unit 73 in each case.

By means of the coupling device 68 of the press 21 it is achieved that the second tool 46 carries out a movement in stroke direction H, if ram 27 moves in stroke direction H and the ram surface 71 abuts against the tool coupling surface 69 (FIG. 3). In doing so, a round blank 59 can be lifted from the sliding surface 58 and moved into ring 64 in order to form or emboss the round blank 59 inside the ring 64 between the tools 45, 46.

The tool coupling surface 69 abuts against the stop surface 70 in the rest position of the second tool 46. It is possible that the second tool 46 carries out only a portion of the stroke movement of the ram 27. The stroke of the ram 27 of the press 21 in stroke direction H can be longer than the movement in stroke direction H carried out by the second tool 46.

In addition, the press 21 has a positioning device 82 having at least one and according to the example two positioning bodies 83. The positioning bodies 83 are movable in stroke direction H and back-stroke direction R by means of a positioning drive 84 in each case. The positioning drive 84 can be realized by a cylinder.

The positioning bodies 83 taper in back-stroke direction R toward their free ends and are conically formed according to the example. Each positioning body 83 is assigned to a positioning recess 85 provided on the tool unit 20 and according to the example on the tool carrier 31. The positioning recesses 85 are open in stroke direction H in the embodiment. They taper inwardly in back-stroke direction R and are particularly conically formed analog to the respectively assigned positioning body 83.

By means of the positioning drives 84 the positioning bodies 83 can be moved in an alignment position III (FIG. 1) in which the positioning bodies 83 project into the respective assigned positioning recess 85 and abut inside the positioning recess 85 against the tool carrier 31. The tool unit 20 is orientated relative to the press frame 22, because the positioning bodies 83 as well as the positioning recesses 85 are formed in a manner tapering and particularly conically tapering in back-stroke direction R. The frame guide device 24 and the movement guide device 25 are provided with a respective clearance. The holder 23 of the press frame 22 is therefore configured, such that a relative movement between the tool unit 20 and the press frame 22 is possible.

In addition, the press 21 has a clamping device 90. The clamping device 90 is configured to effect a clamping force between the tool carrier 31 and the press frame 22 and according to the example the movement guide device 25 and the frame guide device 24. In doing so, the tool unit 20 is clampingly fixed in the holder 23 of the press frame 22. In the embodiment the clamping device 90 has multiple and according to the example four clamping bodies 91 for this purpose that are movable by means of a respectively assigned clamping drive 92 in a clamping position IV (FIGS. 2-5). In the embodiment the clamping bodies 91 are moved by means of a respectively assigned clamping drive 92 in back-stroke direction R or stroke direction H. The clamping drive 92 can be realized, for example, by a cylinder and particularly a hydraulic cylinder. In the clamping position IV the clamping body 91 is pressed against the tool carrier 31 in back-stroke direction R by means of the clamping drive 92. In the embodiment thereby the top groove flanks 33 are pressed with the clamping force against the respectively adjacent guide projection 26. A force-fit attachment of the tool unit 20 in the holder 23 is achieved. The clamping bodies 91 abut only in a force-fit manner against the tool carrier 31 and do not establish a form-fit connection. In doing so, it is guaranteed that the relative position and the relative orientation between the tool unit 20 and the press frame 22 adjusted by means of the positioning device 82 is not affected by the clamping device 90.

Figure 11:
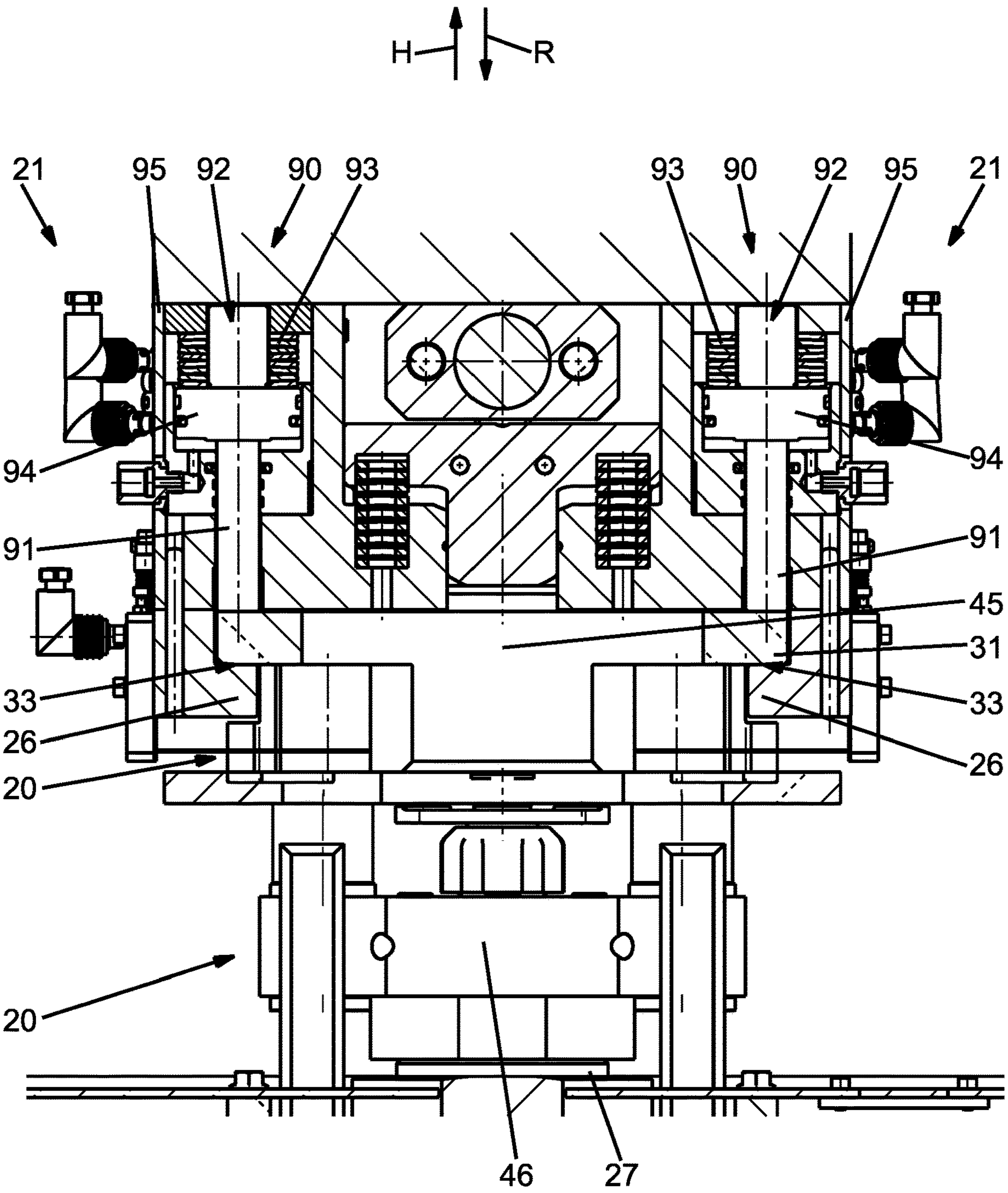

FIG. 11 illustrates an embodiment of the clamping device 90 in which the clamping drive 92 comprises respectively one spring stack and particularly one disc spring stack that is supported on the piston 94 of a cylinder 95. The assigned clamping body 91 is arranged on the piston 94 of the respective clamping drive 92 and projects out of the cylinder 95. The disc spring stack 93 urges the piston 94 together with the clamping body 91 in back-stroke direction R and against the tool carrier 31 in the clamping position IV in order to create the clamping force. A chamber in the cylinder 95 can be subject to a fluid pressure, e.g. a hydraulic pressure, in order to move the piston 94 together with the clamping body 91 in stroke direction H out of the clamping position IV against the force of the disc spring stack 93 and the clamping of the tool unit 20 in the holder 23 can be disabled. Due to the creation of the clamping force with the spring stack and particularly a disc spring stack 93, a clamping effect is guaranteed independent from externally available energy and particularly a fluid pressure.

The arrangement of the tool unit 20 in the press 21 is executed as follows according to the example:

Prior to inserting the tool unit 20 in the holder 23, the positioning device 82, the clamping device 90 and the coupling device 68 are moved in a position in which the insertion or slide movement of the tool unit 20 into the holder 23 is possible. Subsequently, the tool unit 20 is moved into the holder 23, e.g. by using the movement guide device 25 and the frame guide device 24, until the tool unit 20 is completely and correctly arranged in the holder 23. This is detected by means of the sensor device 38 (FIG. 3). As soon as the tool unit 20 is correctly inserted in the holder 23, a positioning, orientating, attaching and coupling of the tool unit 20 and the press 21 is carried out. This can be done either entirely automatically after correct arrangement of the tool unit 20 in the holder 23, which is recognized by means of the sensor device 38, or can be done by an operating person after initiating a respective command.

First, the positioning device 82 is activated and the positioning bodies 83 are moved in their respective alignment position III. In doing so, the positioning bodies 83 project in the respectively assigned positioning recess 85 and align the tool unit 20 relative to the press frame 22. This condition is schematically illustrated in FIG. 1.

Subsequently, the clamping device 90 and the coupling device 68 are concurrently or subsequently activated. Preferably the clamping bodies 91 of the clamping device 90 are first moved in their respective clamping position IV and thus a clamping attachment of the tool unit 20 in the holder 23 of the press frame 22 is effected. After this attachment the positioning bodies 83 of the positioning device 82 are moved out of their alignment position III, such that a contact between the positioning bodies 83 and the tool unit 20 or the tool carrier 31 does no longer exist (FIG. 2). In addition, the coupling device 68 or the actuator unit 73 is operated such that the second tool 46 is urged by means of a biasing force of the biasing device 74 in the rest position against the stop surface 70 (FIG. 2). Now the press 21 is ready for operation.

Now a round blank 59 can be supplied between the two tools 45, 46 for embossing. The ram 27 is moved in stroke direction H by means of the ram drive 28, such that the ram surface 71 gets into contact with the tool coupling surface 69. In case of a continued stroke of the ram 27 in stroke direction H, the second tool 46 is moved together with it in stroke direction H. Thereby the supplied round blank 59 is moved by means of the second tool 46 along the tool axis A toward the first tool 45 that is in the forming position I and is formed between the two tools 45, 46 (FIG. 3). The first tool 45 is supported in the forming position I at the ejector device 62 and does not move in stroke direction H. The round blank 59 is located inside the ring 64 during forming that limits the radial expansion of the round blank 59.

After forming the round blank 59 has an outer diameter that corresponds to the inner diameter of ring 64. The formed or embossed round blank 59 is held in a force-fit manner in the ring 64, if the second tool 46 moves away from the first tool 45 due to the back-stroke movement of the ram 27 in back-stroke direction R until it takes its rest position in which the tool coupling surface 69 abuts against the stop surface 70 (FIG. 4). In order to discharge the formed or embossed round blank 59 from ring 64, the ejector device 62 moves the first tool 45—at least temporarily concurrently or subsequent to the back-stroke movement of the second tool 46—in back-stroke direction R into ring 64 and presses the formed or embossed round blank 59 out of ring 64 (FIG. 4). Thereby the first tool 45 is in the ejector position II. Subsequently the first tool 45 is moved back again in forming position I while the formed or embossed round blank 59 is cart off the tool unit 20 and a new round blank to be formed or to be embossed is supplied. This forming or embossing process is repeated in a cyclic manner.

Figure 5:
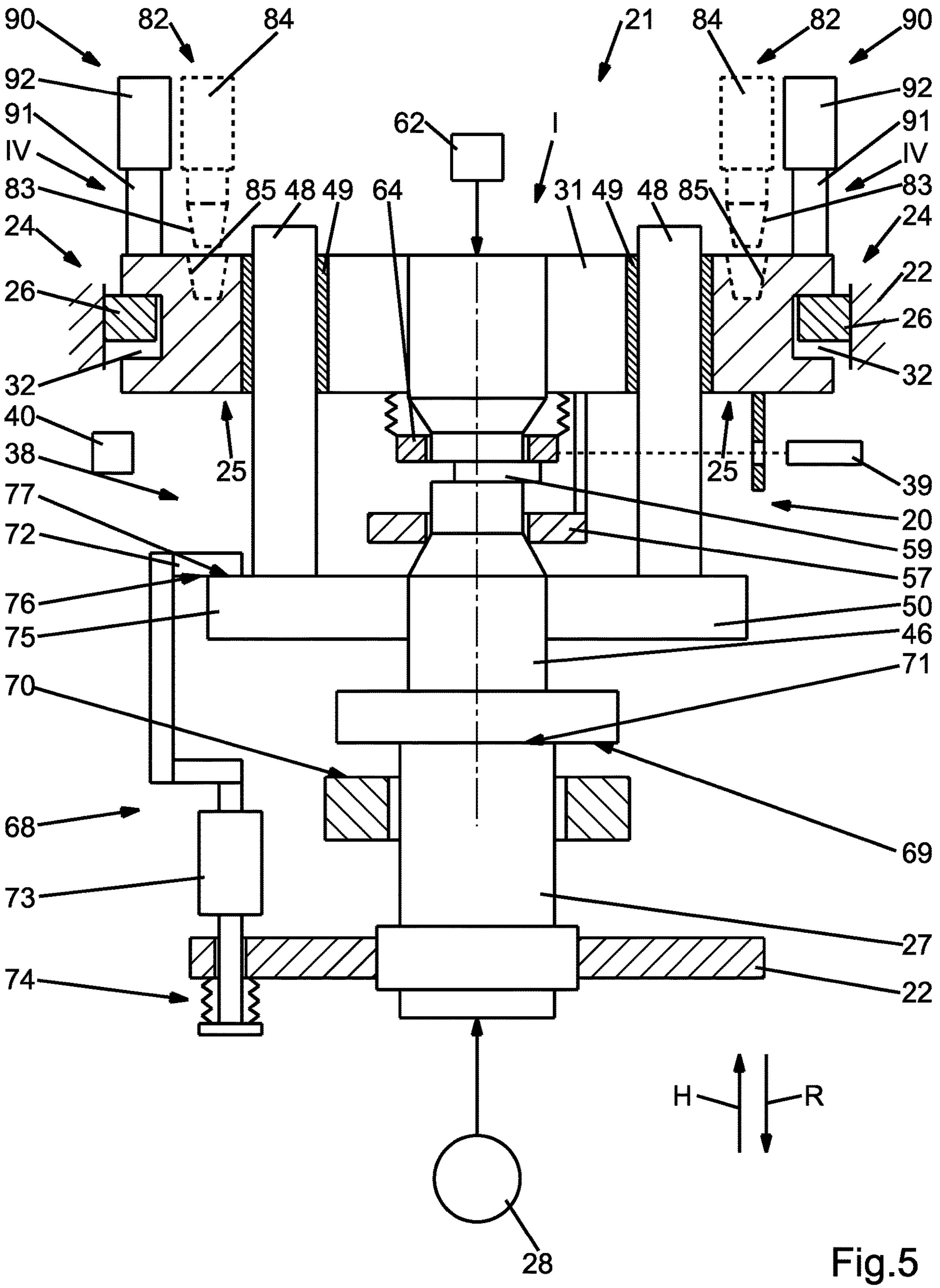
FIG. 5 the embodiment according to FIGS. 1-4 in which the round blank has been positioned incorrectly prior to embossing.

In the embodiment the sensor device 38 has an additional function for monitoring the forming or embossing that is schematically illustrated in FIG. 5. If a round blank 59, that is not arranged in alignment along the tool axis A with the interior of ring 64, is lifted by means of the second tool 46, the round blank 59 does not reach the interior of ring 64. Rather the ring 64 is displaced due to the contact with the round blank 59 against its spring support into the light path and interrupts the light path between the light transmitter 39 and the light receiver 40. Thereby an error during forming or embossing of a round blank 59 can be recognized.

The invention refers to tool unit 20 and a press 21, particularly an embossing press. The tool unit 20 can be simply and quickly arranged in or removed from a holder 23 of the press 21 in order to carry out a quick tool change with short downtime of press 21. For this purpose the tool unit 20 comprises a first tool 45 and a second tool 46 that are arranged along a tool axis A on a tool carrier 31. By means of a tool guide device 47, the second tool 46 is movably supported in a guided manner relative to the tool carrier 31 and relative to the first tool 45, independent from guide devices of press 21. Therefore, the tool unit 20 can be prepared and set up during the ongoing operation of press 21. If desired or necessary, the prepared tool unit 20 is exchanged against the presently used tool unit 20.

LIST OF REFERENCE SIGNS

20 tool unit
21 press
22 press frame
23 holder
24 frame guide device
25 movement guide device
26 guide projection
27 ram
28 ram drive
31 tool carrier
32 movement recess
33 top groove flank
34 bottom groove flank
38 sensor device
39 light transmitter
40 light receiver
41 through-hole
45 first tool
46 second tool
47 tool guide device
48 guide column
49 guide bushing
50 transverse support
51 first pressure piece
52 first embossing stamp
53 second pressure piece
54 second embossing stamp
57 transport part
58 slide surface
59 round blank
62 ejector device
63 ejector
64 ring
68 coupling device
69 tool coupling surface
70 stop surface
71 ram surface
72 coupling part
73 actuator unit
74 biasing device
75 counter coupling part
76 coupling surface
77 counter coupling surface
82 positioning device
86 positioning body
84 positioning drive
85 positioning recess
90 clamping device
91 clamping body
92 clamping drive
93 disk spring stack
94 piston
95 cylinder
I forming position
II ejecting position
III alignment position
IV clamping position
A tool axis
H stroke direction
R back-stroke direction

What is claimed is:

1. A press (21) for forming a round blank (59) comprising:

a holder (23) for an exchangeable tool unit (20) that comprises a first tool (45) and a second tool (46) that is movably supported in a stroke direction (H) toward the first tool (45) and in a back-stroke direction (R) away from the first tool (45) along the tool axis (A), a positioning device (82) that comprises at least one positioning body (83) that cooperates with one assigned positioning recess (85) on the tool unit (20) respectively in order to position and/or align the tool unit (20) relative to the press (21), the positioning recess (85) has a form tapering from an open end toward the other end of the positioning recess (85) and the at least one positioning body (83) tapers in the backstroke direction R toward its free end, and, a clamping device (90) that is configured to clamp the tool unit (20) arranged in the holder (23) after the positioning device (82) has positioned and/or orientated the tool unit (20) relative to the press (21).

2. The press according to claim 1, further comprising a coupling device (68) is provided that is configured to couple the second tool (46) with a ram (27) of the press (21), such that the movement of the ram (27) is transferred to the second tool (46) at least in a movement area of the ram (27).

3. The press according to claim 2, further comprising the coupling device (68) is configured to urge the second tool (46) in the back-stroke direction (R) with a coupling force toward the ram (27).

4. The press according to claim 3, further comprising a stop surface (70) is provided against which the second tool (46) is urged due to the clamping force in a rest position.

5. The press according to claim 2, further comprising the coupling device (68) is configured to allow transverse movements of the ram (27) transverse to the tool axis (A) and/or tilting movements of the ram (27) relative to the tool axis (A).

6. The press according to claim 1, further comprising a frame guide device (24) is provided in the holder (23) that cooperates with a movement guide device (25) provided on the tool unit (20).

7. The press according to claim 6, wherein a clearance is provided between the frame guide device (24) and the movement guide device (25) configured for the possibility of relative movement between the tool unit (20) and the press frame (22).

8. The press according to claim 1, further comprising a positioning drive (84) is provided and configured to move the positioning bodies (83) in stroke direction (H) and backstroke direction (R) and can be moved into an alignment position (III), wherein the positioning bodies (83) project into the respective assigned positioning recess (85) and abuts against the tool carrier (31) inside the respective assigned positioning recess (85).

9. The press according to claim 1, further comprising a sensor device (38) is provided and configured to detect that the tool unit (20) is completely and correctly arranged in the holder (23).

10. The press according to claim 1, wherein the exchangeable tool unit (20) comprises:

a tool carrier (31) that is configured to be exchangeably connected with the press (21), the first tool (45) and the second tool (46) are arranged in alignment with the tool axis (A) on the tool carrier (31), wherein the second tool (46) is movably arranged in a guided manner on the tool carrier (31) along the tool axis (A) by means of a tool guide device (47) such that the second tool (46) is movable in the stroke direction (H) toward the first tool (45) and in the back-stroke direction (R) away from the first tool (45), wherein the second tool (46) is configured to be movably coupled with a ram (27) of the press (21).

11. The press according to claim 10, wherein the tool guide device (47) is configured to support transverse movements of the second tool (46) transverse to the tool axis (A) and/or tilting movements of the second tool (46) relative to the tool axis (A).

12. The press according to claim 10, wherein the tool guide device (47) comprises at least one guide column (48) that is movably supported in an assigned guide bushing (49) in the stroke direction (H) and the back-stroke direction (R).

13. The press according to claim 12, wherein the second tool (46) is movably coupled with the at least one guide column (48) and that the at least one guide bushing (49) is arranged on the tool carrier (31).

14. The press according to claim 10, wherein the second tool (46) comprises a tool coupling surface (69) that is configured to be in abutment against a ram surface (71) of a ram (27) of the press (21) during movement of the second tool (46) in stroke direction (H).

15. The press according to claim 10, wherein the first tool (45) is movable relative to the tool carrier (31) between a forming position (I) and an ejecting position (II).

16. The press according to claim 15, wherein in the forming position (I) the first tool (45) is immovably supported in stroke direction (H) on the tool carrier (31) and/or the press (21).

17. The press according to claim 10, further comprising a transport part (57) having a sliding surface (58) for sliding transport of round blanks (59) into the tool unit (20) and out of the tool unit (20) is provided on the tool carrier (31).

18. The press according to claim 10, further comprising a movement guide device (25) is provided on the tool carrier (31) that is configured to cooperate with a frame guide device (24) on a press frame (22) of the press (21) in order to move the tool unit (20) in an insertion direction into the press (21) or out of the press (21).

19. The press according to claim 10, wherein the one positioning recess (85) is provided on the tool carrier (31) that is configured to cooperate with the at least one positioning body (83) of the press (21) in order to define a relative position and/or relative orientation between the tool unit (20) and the press (21).

20. A method of operating the press for forming the round blank according to claim 1, said method comprising the following steps:

Inserting the tool unit (20) in the holder (23) of the press (21),

Positioning and/or aligning the tool unit (20) relative to a press frame (22) by means of the positioning device (82) in that the at least one positioning body (83) of the positioning device (82) is projecting in the associated positioning recess (85) on the tool unit (20), the positioning recess (85) has a form tapering from the open end toward the other end of the positioning recess (85) and the at least one positioning body (83) tapers in the backstroke direction R toward its free end, Clamping the tool unit (20) on the press frame (22) by means of a clamping device (90), and Retracting the at least one positioning body (83) out of the positioning recess (85) on the tool unit (20).

21. The method according to claim 20, wherein the tool unit (20) comprises the first tool (45) and the second tool (46) and that the second tool (46) is movably coupled by means of a coupling device (68) with a ram (27) of the press (21) subsequent to positioning and/or aligning the tool unit (20) relative to the press frame (22).

* * * * *